UNITED STATES PATENT OFFICE.

ARTHUR H. KRIEGER, OF LOS ANGELES, CALIFORNIA, AND WALTER L. JORDAN, OF NEW YORK, N. Y.

HEAT-INSULATING FORMED BODY AND METHOD OF MAKING SAME.

1,393,225.     Specification of Letters Patent.     Patented Oct. 11, 1921.

No Drawing.     Application filed November 28, 1919. Serial No. 341,228.

*To all whom it may concern:*

Be it known that we, ARTHUR H. KRIEGER and WALTER L. JORDAN, citizens of the United States, and residents, respectively, of Los Angeles, county of Los Angeles, State of California, and city, county, and State of New York, have invented certain new and useful Improvements in Heat-Insulating Formed Bodies and Methods of Making Same, of which the following is a specification.

Our invention has for its object, to provide, at low cost, molded or formed bodies of good heat insulating quality, light weight and fair mechanical strength. Another object in view is to derive a valuable by-product from waste material arising in the sugar refining industry. As the source of the material of which the formed bodies are to be made, will, in most cases be found in the refuse matter from the sugar refinery, we shall describe the invention with reference to the use of such material, by way of example.

In the refining of sugar, diatomaceous earth in finely divided form finds extensive application as a filtering medium, during its use in the filtration process, it accumulates and retains the impurities found in the raw sugar solutions. There is also some absorption of the sugar solution, and the surface of the particles of diatomaceous earth holds by adsorption sufficient of these materials to form a film around all of the particles. We have discovered that the impurities and sugary matter retained in these ways by diatomaceous earth, render the particles of the latter self-bounding so that upon recovery of the same from the waste wash water by settling, filtration or other suitable operation, a material is derived from which can be formed coherent bodies having valuable properties. For example, this composite material may be molded immediately after recovery, that is to say, while it is still moist, and then allowed to dry. It has a certain amount of strength after drying, so that it may readily be handled without molds. The strength of the molded material, however, is greatly increased by proper treatment with heat.

The impurities that accumulate during the refining process consist principally of mineral salts of inorganic and organic acids, cane and invert sugars, particles of cane fiber, and other soluble and insoluble matter found in raw sugar. The particular components of this complex mixture of substances accumulated by the diatomaceous earth will naturally depend on the quality or particular nature of the raw sugar which is being refined. That is to say, the relative quantities of the different substances are subject to considerable variation, but most of those named are present to greater or less extent in any raw sugar solution. The precise composition and proportions of ingredients is fortunately not of great consequence in the particular use which we propose for this complex mixture.

The waste material from the sugar refining operation may be molded and dried with or without the addition of suitable fiber, depending on the use for which the finished product is intended. After the molded material has dried, it possesses a fair degree of mechanical strength which may be increased by burning by the methods used in the ceramic industry, at a temperature sufficient to cause the mineral impurities to bond by incipient fusion. The resulting composition is of very light weight and the formed body acquires sufficient strength to withstand rough handling.

It is to be noted that the materials accumulated from the sugar solution by the diatomaceous earth bond the particles of diatomaceous earth together and permit the molding of the composition into a coherent body by simply drying the same. These articles can then be handled safely without molds, as for example, when placing them into kilns for burning or for manipulating them in other ways as where other work is to be done upon them. They may be fashioned into any particular shape or configuration required. Ordinarily, articles molded of diatomaceous earth by mixing water therewith, are very fragile when dry and can not be handled except with great care or in molds.

The properties of diatomaceous earth as a thermal insulating material are well known. We are aware that many processes have been proposed in which various bonding ingredients are added to the diatomaceous earth. The material which we intend primarily to employ for producing the finished articles is however, already obtained as a waste product in the sugar refining industry and has not heretofore been applied to any such use as herein proposed. The process is therefore believed to constitute an important improvement in that it utilizes for a particular purpose those impurities which accumulate in what would otherwise be a waste material, and by suitable manipulation thereof converts them into an article of value. Furthermore, the bonding materials as heretofore proposed have not included, so far as we are aware, the particular ingredients or kinds of substances which are found in the materials described, and the resulting article derives beneficial properties which are peculiar thereto.

We claim:

1. A heat insulating body comprising finely divided diatomaceous earth bonded by substances such as accumulated therein from the filtration of sugars, formed into the desired shape and dried.

2. A formed heat insulating body comprising finely divided diatomaceous earth bonded by substances accumulated from the filtration of sugar solutions and burned into a firmly coherent integral structure.

3. A heat insulating body comprising waste diatomaceous earth from sugar refining, and an admixture of strengthening fiber, molded and dried.

4. A heat insulating body comprising waste diatomaceous earth from sugar refining, molded, dried and burned.

5. The process of making heat insulating bodies which comprises molding and drying waste diatomaceous earth derived from a sugar refining operation.

6. The process of making heat insulating bodies which comprises molding and drying the waste diatomaceous earth derived from sugar refining, and burning the molded articles to increase the mechanical strength thereof.

ARTHUR H. KRIEGER.
WALTER L. JORDAN.